United States Patent [19]

Bravo

[11] Patent Number: 5,351,707
[45] Date of Patent: Oct. 4, 1994

[54] VIBRATION-RESISTANT IMPACT VALVE FOR VAPOR RECOVERY LINE

[76] Inventor: Sergio M. Bravo, 2872 Tigertail Dr., Los Alamitos, Calif. 90720

[21] Appl. No.: 101,979

[22] Filed: Aug. 4, 1993

Related U.S. Application Data

[63] Continuation of Ser. No. 17,654, Feb. 12, 1993, Pat. No. 5,289,842.

[51] Int. Cl.⁵ .............................................. F16K 17/40
[52] U.S. Cl. .................... 137/68.1; 137/356; 137/543.17
[58] Field of Search ............ 137/68.1, 69, 71, 356, 137/543.17

[56] References Cited

U.S. PATENT DOCUMENTS

| | | | |
|---|---|---|---|
| 2,048,388 | 7/1936 | Johnsen | 137/162 |
| 2,906,280 | 9/1959 | Mount | 137/68 |
| 3,630,214 | 12/1971 | Levering | 137/68.1 |
| 4,047,548 | 9/1977 | Wagner | 141/52 |
| 4,064,889 | 12/1977 | Gayle et al. | 137/68.1 |
| 4,800,913 | 1/1989 | Nitzberg et al. | 137/68.1 |
| 4,842,163 | 6/1989 | Bravo | 222/40 |
| 4,886,087 | 12/1989 | Kitchen | 137/68.1 |
| 4,896,688 | 1/1990 | Richards et al. | 137/68.1 |
| 5,054,509 | 10/1991 | Grantham | 137/68.1 |
| 5,103,853 | 4/1992 | McGushion et al. | 137/71 |

Primary Examiner—Stephen M. Hepperle
Attorney, Agent, or Firm—Christie, Parker & Hale

[57] ABSTRACT

An impact valve with an easily replaceable, breakable valve assembly includes a valve body with a valve opening for connecting to a vapor recovery pipeline connected between a vapor inlet and a vapor recovery tank, or connected between a gasoline product pipeline and a gasoline pump dispenser or self-contained system (i.e., a nonpressurized system), a housing threaded to the valve body, a valve plug located in the housing, a spring for biasing the valve member toward the valve opening in order to close the opening, and a plunger for holding the valve plug against the bias of the spring to keep the valve open, the valve plug having an extension with an end portion that securely mates with an end portion of the plunger to avoid necessary actuation, and the valve body having a weakened circumferential area around the plunger so that the valve body will readily break in response to impact and readily displace the plunger to release the valve plug.

16 Claims, 3 Drawing Sheets

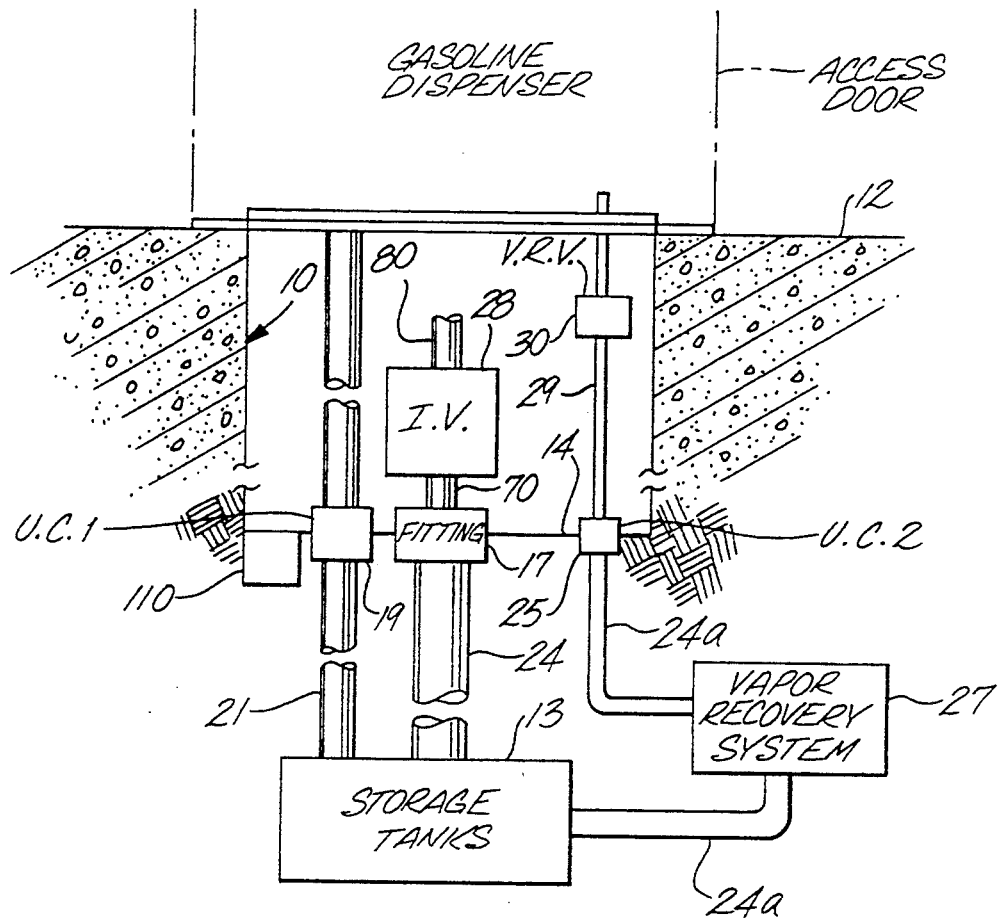
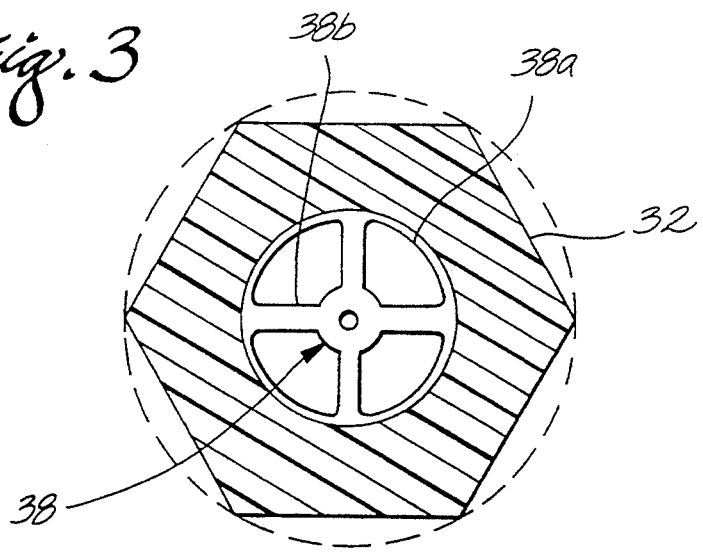

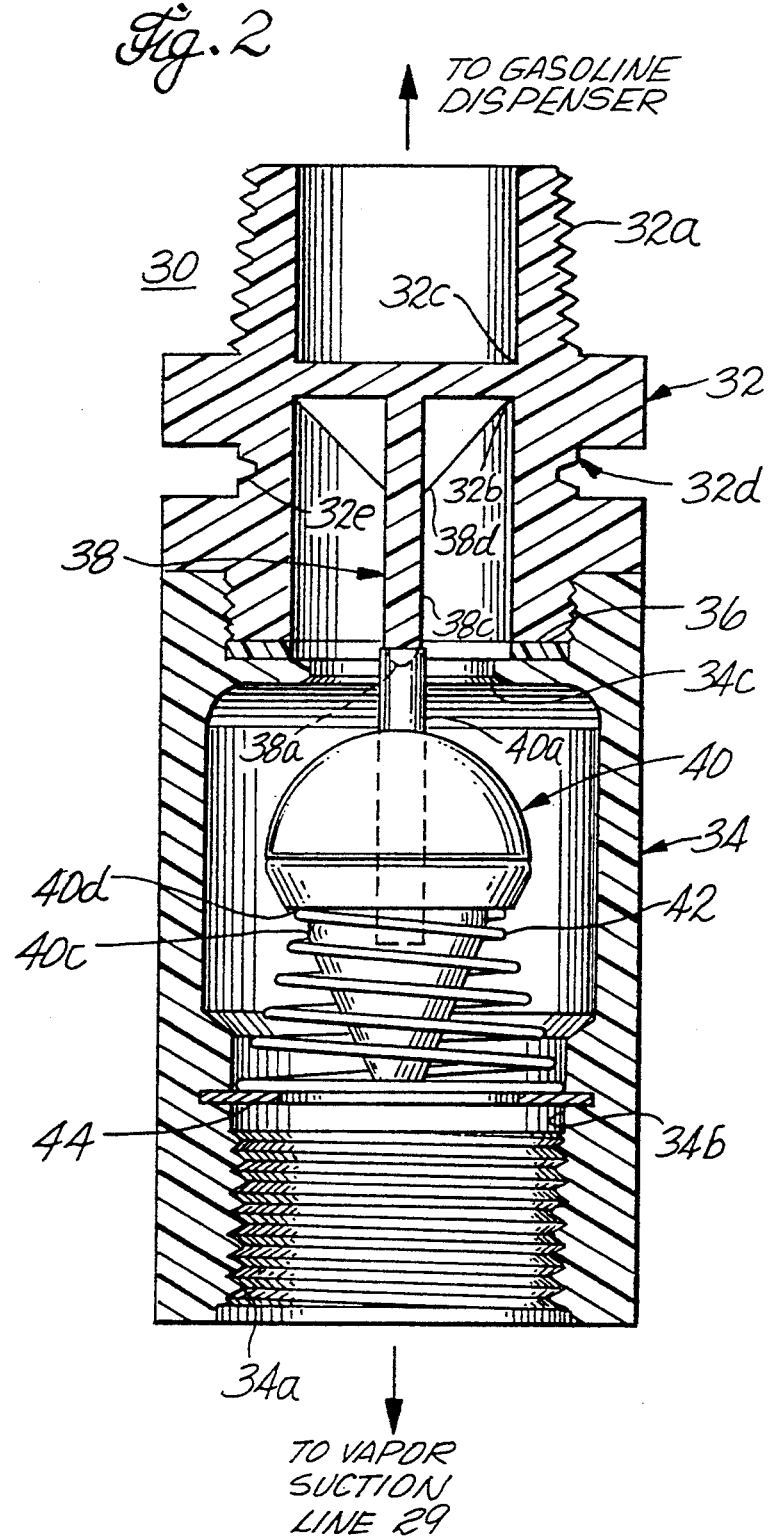

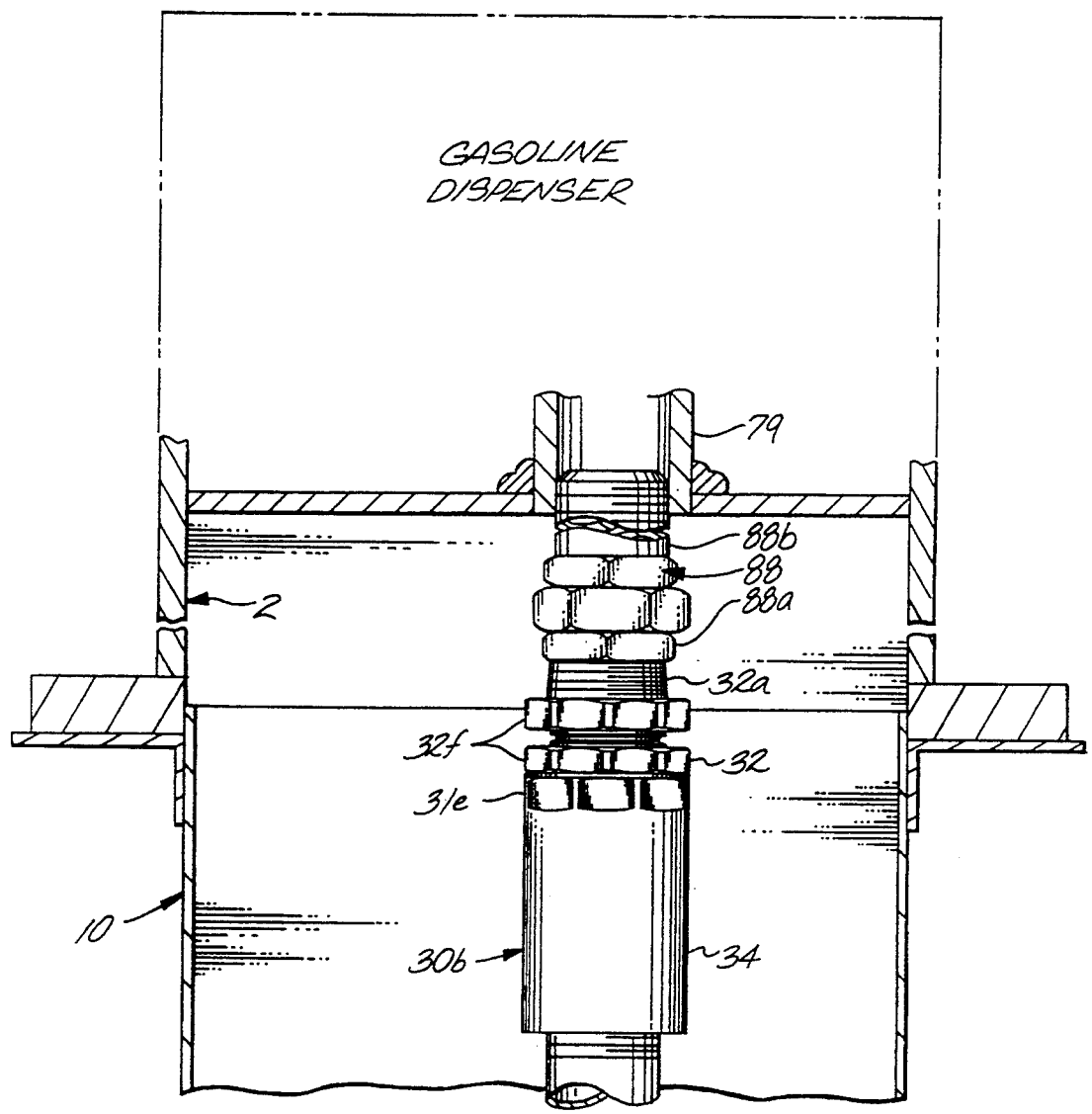

VIBRATION-RESISTANT IMPACT VALVE FOR VAPOR RECOVERY LINE

This is a continuation of application Ser. No. 08/017,654 filed Feb. 12, 1993, now U.S. Pat. No. 5,289,842.

BACKGROUND OF THE INVENTION

The present invention relates to a vibration-resistant impact valve with a replaceable, breakable top valve assembly. More particularly, the invention relates to such an impact valve for a gasoline vapor recovery pipeline or for a gasoline supply pipeline, but for suction systems or self-contained (own motor) systems only (not for pressurized systems).

To minimize fire and explosion hazards for gasoline dispensers and pipelines associated with such dispensers, the gasoline supply pipeline is typically provided with an impact valve near the gasoline dispenser. Such an impact valve is normally open, but will block the gasoline product line in response to sufficient impact with the gasoline dispenser. Until now, no such valve has been used on, or available for, gasoline vapor recovery lines. Such lines also create a risk of fire or explosion if broken. However, because impact valves are normally quite complicated in structure, difficult to replace, expensive, and would not create an airtight seal, and because no one is known to have put such a valve on the vapor recovery line, there have been no such valves for a vapor recovery line. Moreover, the valves are constructed so that upon sufficient impact to cause them to operate, they often will also become broken. Accordingly, they must be replaced. It is commonplace to make these valves relatively strong, but if there is a collision with the gasoline dispenser, the pipeline connected to the valve can also break. In addition, the valves are too sensitive in that they can be set off by a vibration or a minor earthquake or other disturbance, even if the pipeline does not break. In such a case, gasoline or vapor cannot be properly vented and may create a serious hazard or cause the dispenser to shut down without a clue as to the problem. These are problems for both existing valves on gasoline supply lines and for any valve, if it were to be used in a vapor recovery line. Accordingly, it is desirable to have a simple, inexpensive, easily replaceable impact valve which will localize the damage from impact, as well as reliably remain open and reliably seal the gasoline pipeline or gasoline vapor line in the event of impact.

SUMMARY OF THE INVENTION

An impact valve with an easily replaceable, breakable valve assembly includes:
- a valve body with a valve opening for connecting to a vapor recovery pipeline connected between a vapor inlet proximate a gasoline dispenser and a vapor recovery tank, or connected between a gasoline product pipeline and a gasoline pump dispenser or self-contained dispenser system, i.e., a suction system only;
- a housing threaded to the valve body;
- a valve plug located in the housing;
- a spring for biasing the valve plug toward the valve opening in order to close the opening; and
- a plunger formed unitarily with the valve body for holding the valve plug against the bias of the spring to keep the valve open, the plunger having an end portion for mating with an end portion of a projection from the valve plug, so as to securely hold the plunger in place during normal operation, and the valve body having a weakened circumferential area around the plunger so that the valve body will readily break in response to impact and readily displace or break the plunger to release the valve plug.

BRIEF DESCRIPTION OF THE DRAWINGS

Preferred embodiments of the invention will be described in more detail below in connection with the accompanying drawings, in which:

FIG. 1 is a front partial-schematic view of a gasoline collector box for mounting beneath the gasoline dispenser, which box has an impact valve assembly therein and includes vapor recovery system piping and a vapor recovery valve according to the invention;

FIG. 2 is a cross-sectional view of a vapor recovery valve according to a first embodiment of the invention;

FIG. 3 is a top view of a valve body including a plunger in the valve of FIG. 2; and FIG. 4 is an elevational view of a valve such as that of FIG. 2 in place of an impact valve in a gasoline product line such as in FIG. 1.

DETAILED DESCRIPTION OF THE PREFERRED EMBODIMENTS

In a gasoline containment system within which the present invention may be used, a gasoline collector 10, such as a containment box, is mounted underneath a gasoline pump dispenser 2, and has a gasoline supply pipe 70 passing through it to the dispenser's inlet. The box has an adjustable fitting 17 which seals the supply pipe where it passes through the box and connects to another gasoline supply pipe 24 connected to storage tanks 13. The fitting 17 is preferably such that it can be adjusted, i.e., loosened, to allow positioning, and even complete removal of the supply pipe without removing the box or dispenser. The box also has an electrical conduit 21 passing through it, and has a first universal coupler fitting 19 (U.C.1) for sealing box 10 where conduit 21 passes through it. Further, vapor recovery piping 29 in the box communicates with further vapor recovery piping 24a by a second universal coupler fitting 25 (U.C.2) for making this connection and sealing box 10. The further vapor recovery piping 24a communicates with a vapor recovery system 27, including a pump for sucking leaking vapors from the dispenser as is well known in the art, and further communicates with the storage tanks 13 where the vapors are returned.

The containment box 10 is the subject of U.S. Pat. Nos. 4,842,163; 4,971,225, and 5,100,024, all incorporated herein by reference. Box 10 is shown installed in a concrete island 12 of the type typically found in service stations. Current practice is to mount gasoline dispensers over openings in the concrete island through which the gasoline lines and electrical lines necessary for the operation of the dispenser are run. Following this practice, in the exemplary embodiment of the present invention, the dispenser is mounted over box 10 installed in the island.

Box 10 is hollow and rectangular and has an open top and a floor 14, which is shown flat but may be slanted. Box 10 is made of any durable material that resists corrosion and can stand up to contact with gasoline, such as steel with a protective coating, and prevent it from seeping through.

An impact or shear valve assembly 28 is provided in the gasoline supply line between pipes 70 and 80. This shear valve shuts off the supply of gasoline to the dispenser in the event of an emergency. Shear valves of this type are in common use with gasoline dispensers. A suitable shear valve is shown, e.g., in U.S. patent application Ser. No. 07/836,787, filed Feb. 14, 1992, hereby incorporated by reference.

Adjustable fitting 17 and universal coupling fittings 19 and 25 are described in detail in the above-mentioned application Ser. No. 07/836,787.

In accordance with the invention, a shear valve 30, or vapor recovery valve (VRV), is disposed in vapor recovery line 29, preferably in box 10. The vapor recovery valve works as follows: if a car or other object collides with the gasoline dispenser, and thereby causes vapor recovery line 29 to break, line 29 will be shut off automatically. The details of how valve 30 is constructed and operates will now be explained with reference to FIGS. 2-3.

The valve includes a breakable valve body 32, e.g., of silicone or acetal or other relatively easily breakable rubber or plastic, which body is breakable at the top half, and a relatively nonbreakable valve housing 34, e.g., of metal, such as cast iron or stronger plastic, threaded to the breakable valve body. The valve also includes a gasket 36 for sealing the connection of the valve body and valve housing, a plunger 38 located in the valve body and preferably formed unitarily therewith, a valve plug 40, a spring 42 for biasing the plug towards a closed position, and a snap ring 44 for supporting the spring.

Valve body 32 has an upper threaded portion 32a at which it can thread to a top portion of vapor recovery line 29 which leads to the gas inlet or gasoline dispenser. The valve housing has a lower end with internal threads for threading onto a lower end of vapor recovery line 29 which leads to fitting 25 and vapor recovery system 27.

The plunger 38 is formed unitary with internal wall 32c of the valve body at position 32b and has webs 38d (FIG. 2) for supporting ribs 38b (FIG. 3). Valve housing 34 has a recess 34b which seats a snap ring 44. Plunger 38 and plug 40 have mating surfaces to ensure that the valve will not close unless the valve body breaks. For example, plunger 38 has a pointed end 38a which seats in the top of an extension 40a or protrusion of the valve plug 40. The plunger serves to reliably hold the valve plug downward against the bias of spring 42 in mating position due to the mating surfaces to avoid unnecessary actuation due to vibration, routine maintenance on the dispenser or box, or otherwise. Preferably, as shown in FIG. 2, the extension 40a is embedded in the valve plug, e.g., the extension is made of stainless steel and is in the form of a rod with the rubber plug formed around the rod's lower end.

The valve plug 40 also has a lower extension 40c which fits within spring 42 and a shoulder 40d which seats an upper end of spring 42. The lower threaded section 34a of valve housing 34 threads to a lower portion of pipe 29.

The snap ring is preferably of metal, and the plunger is preferably made of plastic, e.g., the same material as the valve body. The valve plug 40 is preferably rubber or plastic sufficient to seal the valve when necessary.

Breakable valve body 32 has a weakened portion 32d having a reduced outer diameter in relation to adjacent portions of the valve body and including a notch or recess 32e. This greatly weakens this portion of the valve body so that when pipe 29 moves, the valve body will break at point 32e and will move the plunger arm 38 sufficiently to unseat it from the extension 40a of the valve plug. This will allow spring 42 to push the half-spherical upper portion of the valve plug 40 against surface 34c, preferably a beveled surface, of valve housing 34. This closes the valve and prevents vapors from escaping.

As can best be seen in FIG. 3, the ribs 38b connect to the inner wall of the valve body and give the plunger a steering wheel shape which allows gas to pass therethrough.

The reduced thickness and/or notch area 32d, 32e constitutes a weakening mechanism for allowing the valve body to break first, before other portions of the line break, and to break at a desired position so that the plunger is dislodged from the valve plug.

Thus, according to the invention, when the breakable valve body 32 breaks, and it is necessary to later replace it to start up again, all that needs to be replaced is the one-piece valve body. The rest of suction line 29 and valve housing 34 will not be broken. The portion of valve body 32 below weakened area 32d will need to be removed from valve housing 34 by unthreading it, and the upper portion above weakened area 32d will also need to be removed by unthreading it. Then, the new valve body is threaded into place.

FIG. 4 shows a cross-sectional view of the valve of FIG. 2 (labeled 30b here) when used as an impact valve in place of impact valve 28 in the gasoline supply line for a suction system or self-contained pump system only, i.e., not a pressurized system. The upper threaded portion 32a of the valve body 32 preferably would thread into the inlet plug 88 at its lower portion 88a which, in turn, threads at portion 88b into inlet 79 of the gasoline dispenser. The lower internal threaded portion 34a of valve housing 34 threads onto pipe 70. If this valve is used in the gasoline dispenser line, however, it is more difficult, though possible, to also link operation of this valve with collection of leaking gasoline in recess 110 in box 10.

As best shown in FIG. 4, surfaces 34e and 32f of the housing 34 and valve body 32, respectively, preferably are hexagonal to provide gripping surfaces for a wrench.

It is understood by those skilled in the art that changes in the form and detail of the above-described embodiments may be made without departing from the spirit of the invention and the scope of the appended claims.

What is claimed is:

1. In an apparatus for recovering flammable vapors, the apparatus including a conduit having a vapor inlet and means for sucking the vapor through the conduit, the improvement comprising a valve disposed along the conduit, the valve comprising a valve body, a valve housing threaded to the valve body, a valve plug disposed in the housing, means for biasing the valve plug towards the valve body and a first position for closing the valve to vapors, and plunger means disposed in the valve body for normally holding the valve plug in a second position away from the valve body in which the valve is open to vapors, the valve body having means for defining a weakened portion for breaking in response to stress more readily than the valve housing and other portions of the valve body, wherein the plunger means and valve plug have mating surfaces which comprise means for securely seating the plunger means in the valve plug so that the plunger means will only be dislodged from the valve plug in response to breakage of the valve body, and further comprising means for integrally attaching the plunger means to the valve body, whereby a broken valve body may be unthreaded and a new valve body identical thereto may be reattached so that its plunger means will press the valve plug away from the new valve body into the second position as the new valve body is threaded to the valve housing.

2. The apparatus of claim 1 wherein the mating surfaces comprise a tapered end portion of the plunger means and a corresponding recess formed in a projection from the valve plug.

3. The apparatus of claim 1 wherein the means for biasing comprises a coil spring, and the valve plug has an end portion which seats inside the coil spring.

4. The apparatus of claim 1 wherein the weakened portion comprises a reduced diameter and reduced thickness portion in relation to other portions of the valve body and having a recess formed therein.

5. The apparatus of claim 1 further comprising a snap ring supported in a recess formed in the valve housing for supporting an end of the means for biasing.

6. The apparatus of claim 1 wherein the plunger means comprises an elongate portion extending axially through the valve body and an upper portion comprising radially extending ribs and webs.

7. The apparatus of claim 1 wherein the conduit is a vapor recovery line connected to a gasoline suction system or self-contained system at one end and to a gasoline supply pipeline at another end.

8. The apparatus of claim 1 wherein the valve and at least a portion of the vapor recovery line are disposed inside a container for flammable fluids disposed underneath the gasoline dispenser, and the conduit is a vapor recovery line which has a fitting for connecting to a bottom of the container.

9. A valve for a flammable fluid vapor recovery apparatus, the valve comprising a valve body, a valve housing threaded to the valve body, a valve plug disposed in the housing, means for biasing the valve plug towards the valve body and a first position for closing the valve to vapors, and plunger means disposed in the valve body for normally holding the valve plug in a second position away from the valve body in which the valve is open to vapors, the valve body having means for defining a weakened portion for breaking in response to stress more readily than the valve housing and other portions of the valve body, wherein the plunger means and valve plug have mating surfaces which comprise means for securely seating the plunger means in the valve plug so that the plunger means will only be dislodged from the valve plug in response to breakage of the valve body, and further comprising means for integrally attaching the plunger means to the valve body, whereby a broken valve body may be unthreaded and a new valve body identical thereto may be reattached so that its plunger means will press the valve plug away from the new valve body into the second position as the new valve body is threaded to the valve housing.

10. The valve of claim 9 wherein the mating surfaces comprise a tapered end portion of the plunger means and a corresponding recess formed in a projection from the valve plug.

11. The valve of claim 9 wherein the means for biasing comprises a coil spring, and the valve plug has an end portion which seats inside the coil spring.

12. The valve of claim 9 wherein the weakened portion comprises a reduced diameter and reduced thickness portion in relation to other portions of the valve body and having a recess formed therein.

13. The valve of claim 9 further comprising a snap ring supported in a recess formed in the valve housing for supporting an end of the means for biasing.

14. The valve of claim 9 wherein the plunger means comprises an elongate portion extending axially through the valve body and an upper portion fixed to an end of the elongate portion and comprising radially extending ribs and webs.

15. The valve of claim 9 wherein the valve housing comprises metal, and the valve body comprises plastic.

16. The apparatus of claim 1 wherein the valve housing comprises metal, and the valve body comprises plastic.

* * * * *